Sept. 26, 1961     V. D. POLHEMUS     3,001,784
AIR SPRING ASSEMBLY

Filed March 18, 1960     2 Sheets-Sheet 1

INVENTOR.
Von D. Polhemus
BY
W. J. Wagner
ATTORNEY

Sept. 26, 1961 V. D. POLHEMUS 3,001,784
AIR SPRING ASSEMBLY
Filed March 18, 1960 2 Sheets-Sheet 2

INVENTOR.
Von D. Polhemus
BY
W. F. Wagner
ATTORNEY

United States Patent Office 3,001,784
Patented Sept. 26, 1961

3,001,784
AIR SPRING ASSEMBLY
Von D. Polhemus, Franklin, Mich., assignor to General Motors Corporation, Detroit, Mich., a corporation of Delaware
Filed Mar. 18, 1960, Ser. No. 15,987
6 Claims. (Cl. 267—65)

The invention relates to fluid suspension and more particularly to means for attaching height sensing leveling valves to fluid springs.

The present invention is concerned primarily with simplifying the structural complexity, cutting the material cost, and reducing the fabrication time involved in manufacturing and assembling fluid suspension systems. Recent analysis of existing constructions revealed many factors which contributed to relatively high cost of air suspension systems without conferring any significant improvement in quality, efficiency or service life. In particular, the invention is concerned with the improvements in the manner and means of attaching leveling valves to the vehicle air springs. In the prior art, certain air suspension systems were equipped with leveling valves which were secured directly to the air springs. In such case, it has been the practice to form the air spring housing with a special valve attachment portion which in varying degrees increased the cost of fabrication of the housing, both in terms of material and processing time. In general, attaching the leveling valves involved the use of threaded members which inherently required performance of tapping operations on the spring housing to accommodate subsequent assembly of the valve in fluid tight communication with the spring.

An object of the present invention is to provide an improved and simplified means for connecting a leveling valve to an air spring.

Another object is to provide an air spring and leveling valve assembly including quick detachable means for securing the leveling valve in positive mechanical and fluid tight engagement with the spring.

A further object is to provide an arrangement of the stated character wherein the sole operation required to be performed on the air spring housing consists of punching a simple aperture in the wall thereof, the said aperture receiving a pilot portion formed on the leveling valve, the latter being mechanically secured in position on the former by means of a tensioned circumferential band.

A still further object is to provide a device of the stated character wherein the surface of the leveling valve adjacent the base of the pilot portion is formed with an annular recess containing an O-ring which abuts the wall of the spring to provide a fluid tight juncture.

Still a further object is to provide an arrangement of the stated character wherein the leveling valve assembly is formed with a radially outwardly facing horizontally extending slot through which a portion of the band extends so that the valve is prevented from rotating about the axis of the pilot portion upon tensioning of the band.

Another object is to provide an arrangement of the stated character wherein the band is tensioned by means of a detachable overcenter toggle lever.

Yet another object is to provide an arrangement of the stated character wherein the band tensioning lever is a generally U-shaped forked member having a transverse cam portion at one end thereof disposed at an angle to the plane of the forked legs, the width of the transverse portion being sufficient so as to intersect the minimum perimetrical distance around the spring and leveling valve, and the angle between the legs and transverse portion being such that when the forked ends engage the housing, the transverse portion moves to an angular position wherein the tension of the band assists in retaining the toggle in band tensioning position.

These and other objects, advantages, and features of the invention will become more fully apparent as reference is had to the accompanying specification and drawings wherein.

Figure 1:
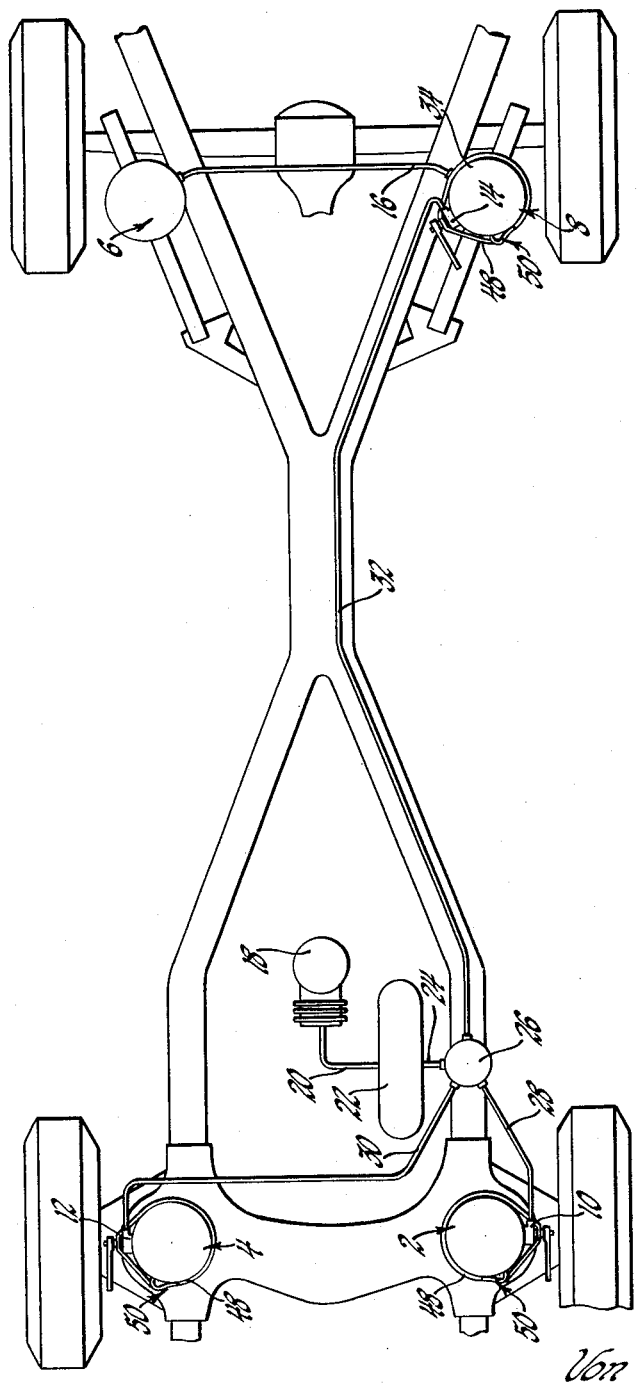
FIG. 1 is a plan view of a pneumatic suspension system for vehicles incorporating an air spring and leveling valve assembly and attachment means therefor in accordance with the invention.
Figure 2:
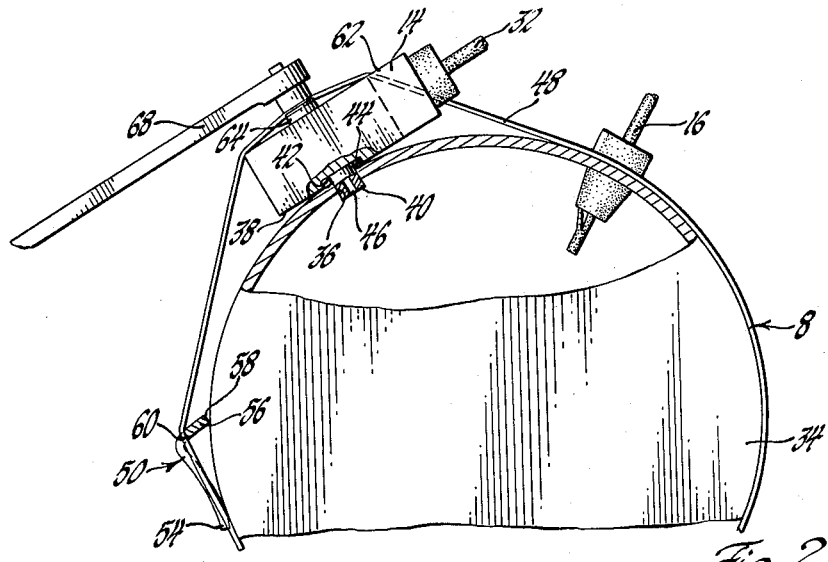
FIG. 2 is an enlarged fragmentary view, partly in section and with parts broken away, illustrating the details of construction of the air spring assemblies of FIG. 1, the parts being shown in relative relationship after final assembly.

Referring now to the drawings and particularly FIG. 1, there is shown a vehicle chassis incorporating a pneumatic suspension system in which the reference numerals 2, 4, 6, and 8 designate air spring assemblies which are arranged with reference to the sprung and unsprung mass of a vehicle in a known manner so as to elastically support the former with respect to the latter. Springs 2 and 4 have directly mounted thereon individual lever operated height sensing leveling valve mechanisms 10 and 12 which function to regulate the flow of air into and out of the springs to maintain the sprung mass at a predetermined vertical level regardless of the load imposed thereon. In accordance with known practice, flow of air into and out of springs 6 and 8 is controlled by a single leveling valve assembly 14 mounted on spring 8, spring 8 being connected in communicating relation with spring 6 by a balance conduit 16. Since details of the internal construction of assemblies 10 and 12 and the mechanism contained therein form no part of the present invention, description thereof is omitted. However, for a complete description of such mechanism, reference may be had to copending application Serial No. 855,324, filed November 25, 1959, Ronald J. Sargent, entitled "Pneumatic Suspension Leveling Valve Mechanism," assigned to General Motors Corporation.

To supply air to the springs in accordance with the regulated positions of leveling valves 10, 12, and 14, there is provided an engine driven air compressor 18 which is connected by a conduit 20 with a high pressure storage tank 22. Storage tank 22 in turn communicates via conduit 24 with a junction body 26 from which high pressure air is conducted to springs 2 and 4 via high pressure conduits 28 and 30 and to springs 6 and 8 via high pressure conduit 32.

Inasmuch as the form, relationship, and method of effecting assembly of each of the springs and associated leveling valves is identical, the following detailed description is made with reference to valve assembly 14 and spring 8, it being understood to apply equally to springs 2 and 4 and their related valve assemblies.

In accordance with one feature of the invention, the rigid dome portion 34 of spring 8 is formed with a simple circular aperture 36, while the inner side wall 38 of leveling valve assembly 14 is formed with a pilot portion 40 which extends through aperture 36. At the juncture of wall 38 and pilot 36, there is formed an annular recess 42 in which is disposed an O-ring 44 which operates to effect a fluid tight juncture between valve assembly 14 and dome 34 when the former is urged radially inwardly relative to the latter in a manner shortly to be described. In order to effect fluid communication between the interior (not shown) of leveling valve assembly 14 and the interior of spring 8, pilot portion 36 includes a central drilled passage 46.

To secure leveling valve 14 in firm engagement with the wall of dome portion 34 in accordance with the present invention, there is provided an endless steel band 48, the circumference of which is somewhat in excess of the minimum perimetrical distance around the dome 34 and valve assembly 14. Spaced a suitable distance circumferentially of dome 34 and disposed between the latter and band 48 is a generally U-shaped overcenter toggle or cam element 50 which is formed and dimensioned in side elevations so that in assembled position, a portion thereof increases the minimum perimetrical distance required to be surrounded by the band. In actual assembly, cam element 50 is capable of considerable latitude of angular positioning in relation to valve assembly 14 so that when in the final assembly position shown in FIG. 3, considerable variation in the degree of tension on the band 48 may be attained. It will be evident that maximum tensioning will occur when the apex of the effective triangle formed by the wedge-like side elevation of element 50 is approximately 90 degrees circumferentially from the location of leveling valve pilot 36.

Figure 5:
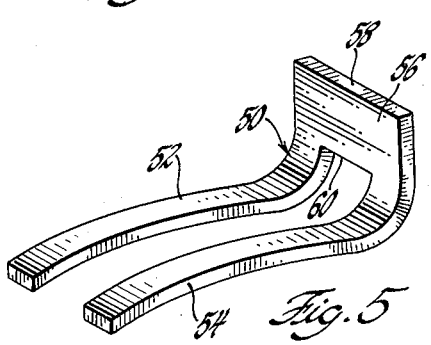
FIG. 5 is an enlarged perspective view showing the form of the toggle lever band tensioner.

As seen best in FIG. 5, cam element 50 is a generally U-shaped plan form sheet metal element having parallel legs 52 and 54 connected by a transverse portion 56 which is bent in side elevation at an angle approximately 90 degrees in the average plane of legs 52 and 54. This space between legs 52 and 54 forms a slot which straddles the band.

Figure 3:
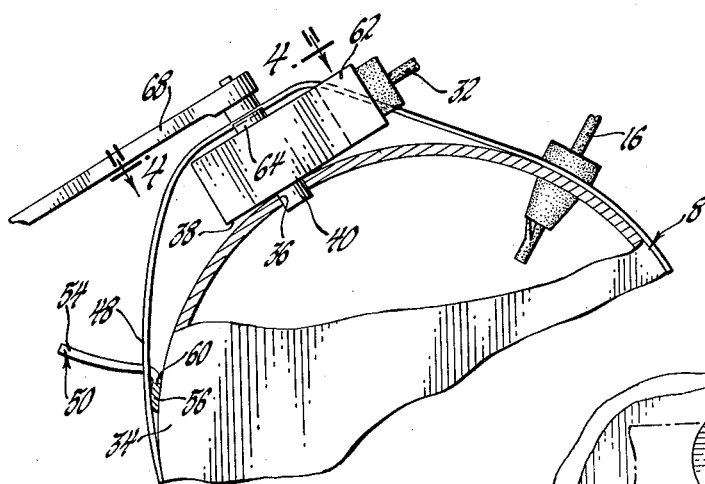
FIG. 3 is a view similar to FIG. 2, showing the relative relation of the parts prior to final assembly.

As seen best in FIG. 3, when element 50 is disposed in straddling relation to band 48 with transverse portion 56 lying flush with the wall of dome 34, the band 48 loosely surrounds the spring and leveling valve assembly. However, due to the width of transverse portion 56, upon swinging movement of legs 52 and 54 in a counterclockwise direction, transverse portion 56 fulcrums outwardly about inner edge 58 until it is perpendicular to the wall of dome 34, at which point maximum tension is effected. Further counterclockwise movement of legs 52 and 54 occurs until the latter abuttingly engage the wall of dome 34. At this point, the outer edge 60 of transverse portion 56 has passed "overcenter" but still occupies an angular position relative to the wall of dome 34 which exerts a high degree of tension on band 48. This tension not only firmly secures leveling valve 14 in assembled relation with spring 8, but also serves to lock the cam element 50 in the overcenter position shown in FIG. 3, since the radial pressure exerted by the load seeks to swing the element further in a clockwise direction.

Figure 4:
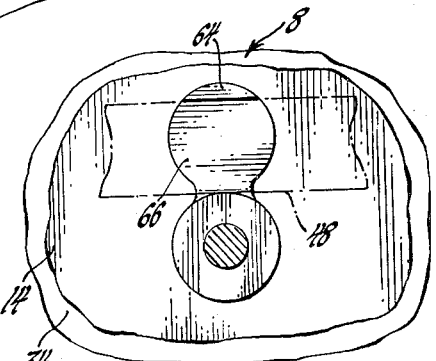
FIG. 4 is an enlarged fragmentary view illustrating a detail of construction of the leveling valve housing.

According to another feature of the invention, as seen best in FIG. 4, the radially outward surface 62 of leveling valve assembly 14 is formed with a boss portion 64 having horizontal slot 66 formed therein, the width of which corresponds to the width of band 48. Since slot 66 closely interfits band 48, the latter serves to "key" the angular position of leveling valve 14 relative to dome 34 and prevents the former from rotating about the axis of pilot 36. Hence, freedom from change in the initial adjustment in length of the link (not shown) connecting the valve operating lever 68 with the unsprung mass of the vehicle is assured.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:
1. In combination with an air spring having a rigid casing, means forming an aperture in the wall of said casing, a leveling valve assembly having a pilot portion extending through said aperture, an endless band encircling said casing and said assembly, and cam means disposed between said casing and said band operable to tension said band and thereby urge said assembly into firm engagement with said casing.

2. In combination with an air spring having a rigid casing, means forming an aperture in the wall of said casing, a leveling valve assembly having a pilot portion extending through said aperture, seal means surrounding said pilot portion and engaging the wall of said casing bounding said aperture, an endless band encircling said casing and said assembly, and cam means disposed between said casing and said band operable to tension said band and thereby urge said assembly into firm engagement with said casing.

3. The structure set forth in claim 2 wherein said assembly is formed with an annular recess surrounding said pilot portion and said seal means comprises an O-ring disposed in said recess.

4. In combination with an air spring having a rigid casing, means forming an aperture in the wall of said casing, a leveling valve assembly having a pilot portion extending through said aperture, an O-ring seal surrounding said pilot portion between said assembly and said casing, a radially outwardly extending boss portion on said assembly, means forming a slot in said boss, an endless band encircling said casing and said assembly, and cam means disposed between said casing and said band operable to tension said band and thereby urge said assembly into firm engagement with said casing, said band being flat and of a width corresponding to the width of said slot and extending through said slot whereby said assembly is prevented from rotating about the axis of said pilot portion when said band is tensioned.

5. In combination with an air spring having a rigid casing, means forming an aperture in the wall of said casing, a leveling valve assembly having a radially inwardly directed pilot portion extending through said aperture, an O-ring seal surrounding said pilot portion between said assembly and said casing, a radially outwardly extending boss portion on said assembly, means forming a slot in said boss, an endless band encircling said casing and said assembly, and cam means disposed between said casing and said band operable to tension said band and thereby urge said assembly into firm fluid tight engagement with said casing, said band being flat and of a width corresponding to the width of said slot and extending through said slot whereby said assembly is prevented from rotating about the axis of said pilot portion when said band is tensioned.

6. A device for connecting a leveling valve assembly in fluid tight engagement with an air spring, comprising an endless band encircling said assembly and spring, the circumference of said band being greater than the minimum perimetrical distance around said assembly and spring, and a forked lever element straddling said band, said lever element having a cam portion disposed between said band and air spring, said cam portion being angularly disposed with respect to said lever element so that swinging movement of the latter in one direction causes the cam to extend radially outwardly a distance intersecting the said minimum perimetrical distance around said assembly and spring.

References Cited in the file of this patent
UNITED STATES PATENTS

| | | |
|---|---|---|
| 2,226,914 | Sharon | Dec. 31, 1940 |
| 2,906,526 | Bowser et al. | Sept. 29, 1959 |
| 2,916,284 | Bertsch et al. | Dec. 8, 1959 |